(12) United States Patent
Zurawski

(10) Patent No.: US 7,533,654 B1
(45) Date of Patent: May 19, 2009

(54) ADAPTIVE GAINS FOR ELECTRONIC AIR INTAKE THROTTLE CONTROL

(75) Inventor: Mark Allen Zurawski, Northville, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 12/040,052

(22) Filed: Feb. 29, 2008

(51) Int. Cl.
*F02D 31/00* (2006.01)
*F02D 1/00* (2006.01)
(52) U.S. Cl. ........................................ 123/376; 123/400
(58) Field of Classification Search ................ 123/376, 123/398, 399, 400, 403, 462
See application file for complete search history.

(56) References Cited

U.S. PATENT DOCUMENTS

| | | | |
|---|---|---|---|
| 3,905,346 A * | 9/1975 | Freismuth et al. | 261/39.3 |
| 3,947,531 A * | 3/1976 | Branigin | 261/39.3 |
| 6,523,522 B1 * | 2/2003 | Costin | 123/399 |
| 6,636,783 B2 | 10/2003 | Yasui et al. | |
| 6,668,214 B2 | 12/2003 | Yasui et al. | |
| 6,830,032 B2 | 12/2004 | Yasui et al. | |
| 7,259,357 B2 * | 8/2007 | Walker | 219/243 |
| 2005/0004723 A1 | 1/2005 | Duggan et al. | |
| 2005/0046375 A1 | 3/2005 | Maslov et al. | |
| 2005/0288153 A1 | 12/2005 | Whitton | |
| 2007/0186914 A1 | 8/2007 | Nakagawa et al. | |
| 2007/0227123 A1 | 10/2007 | Iida et al. | |

\* cited by examiner

*Primary Examiner*—John T Kwon
(74) *Attorney, Agent, or Firm*—Bill C. Panagos; Rader, Fishman & Grauer PLLC

(57) ABSTRACT

A method for determining a coefficient gain to a signal command to actuate an air intake throttle plate to ensure that the throttle plate responds in a desired manner within a desired responsiveness with relative conformity over the life of the air intake manifold with out losses due to variability in spring/motor/friction responsiveness in the throttle plate actuator. The coefficient gain is multiplied to successive throttle plate command signals to ensure the throttle plate responds as desired. The coefficient gain is re-determined periodically when it is determined that the throttle plate responsiveness does not meet desired throttle plate responsiveness.

8 Claims, 3 Drawing Sheets

US 7,533,654 B1

ADAPTIVE GAINS FOR ELECTRONIC AIR INTAKE THROTTLE CONTROL

TECHNICAL FIELD OF THE INVENTION

Variability in throttle plate responsiveness is due to many factors. Some of them relate to manufacturing tolerances and others relates to age. When air intake throttle plate assemblies age, or are subjected to heavy use, or normal use over prolonged periods, the spring and/or motor in the throttle plate actuator loses its resilience and that causes the throttle plate to decline in responsiveness from a desired throttle plate responsiveness to less than a desired responsiveness. One manner in which this has been handled is the use of PID controllers to account for some of the variation between throttle plate actuators. However, this has not been entirely satisfactory in addressing the non uniformity between throttle plates or during the life of an engine that uses such a throttle plate. One way to address these shortcomings is to determine a gain coefficient to apply to a PID train that will be performed automatically at key-up on an engine by engine basis. This will allow the part to be normalized and acceptable control on parts may be close to the part specification edges.

BRIEF SUMMARY OF THE INVENTION

In one embodiment, the present invention is directed to a method to operate a spring/motor actuated electronic air throttle control in an electronic controlled internal combustion engine with an engine control system having memory. The method comprises the steps of:

determining a desired responsiveness of a throttle plate in an electronic control air throttle assembly;

determining actual responsiveness of a throttle plate in an electronic control air throttle assembly;

determining a coefficient gain for the throttle plate based upon responsiveness of the spring and storing said gain in memory;

adding the coefficient gain to a throttle plate actuation command to operate said throttle plate to compensate for loss of spring action during said throttle plate life and conform the actual throttle plate responsiveness to a determine throttle plate responsiveness.

The coefficient gain is a value multiplied on the actuation command signal from the Engine Control System (ECS) to effect movement of the throttle plate to a desired position, usually from an open to a closed and back again to an open position. The coefficient gain may be determined by applying a fixed current to the throttle plate actuator to open and close a throttle plate a predetermined number of times; determining a maximum amount of time, a minimum amount of time, the coefficient gain being a mean amount of time for the throttle plate to open or close in response to the fixed current signal. The coefficient gain is continuously re-determined and added to successive throttle plate actuation commands.

In another embodiment, the present invention is directed to a method to operate an electronic controlled internal combustion engine with a spring actuated electronic controlled air intake manifold equipped with a throttle plate. The said electronic controlled internal combustion engine is equipped with an engine control system (ECS) with memory and in electronic communication with said air intake manifold. The method comprising:

determining actual responsiveness of the spring actuate throttle plate in the air intake manifold in response to a signal command from the Engine Control System;

comparing the actual responsiveness of the throttle plate to a desired throttle plate responsiveness in memory;

multiplying a coefficient gain to successive signal commands from the Engine Control System to conform successive actual responsiveness times to the desired responsiveness time to compensate for loss of responsiveness in successive throttle plate actuations due to spring variability in the air intake manifold and storing the coefficient gain in memory;

multiplying a coefficient gain to successive air intake throttle command signals from the Engine Control System and comparing the successive actual responsiveness of the throttle plate with desired responsiveness of the throttle plate to determine a new coefficient gain to be applied to ensure the throttle plate actuation is comparable to a desired throttle plate responsiveness.

The coefficient gain is a value multiplied on the actuation command signal to effect movement of the throttle plate to a desired position. The coefficient gain may be determined by applying a fixed current to said throttle plate actuator to open and close a throttle plate a predetermined number of times, determining a maximum amount of time, a minimum amount of time, the coefficient gain being a mean amount of time for the throttle plate to open or close in response to the fixed current signal. The coefficient gain is continuously redetermined and multiplied to successive throttle plate actuation commands.

DETAILED DESCRIPTION OF THE PREFERRED EMBODIMENT(S)

Figure 1:
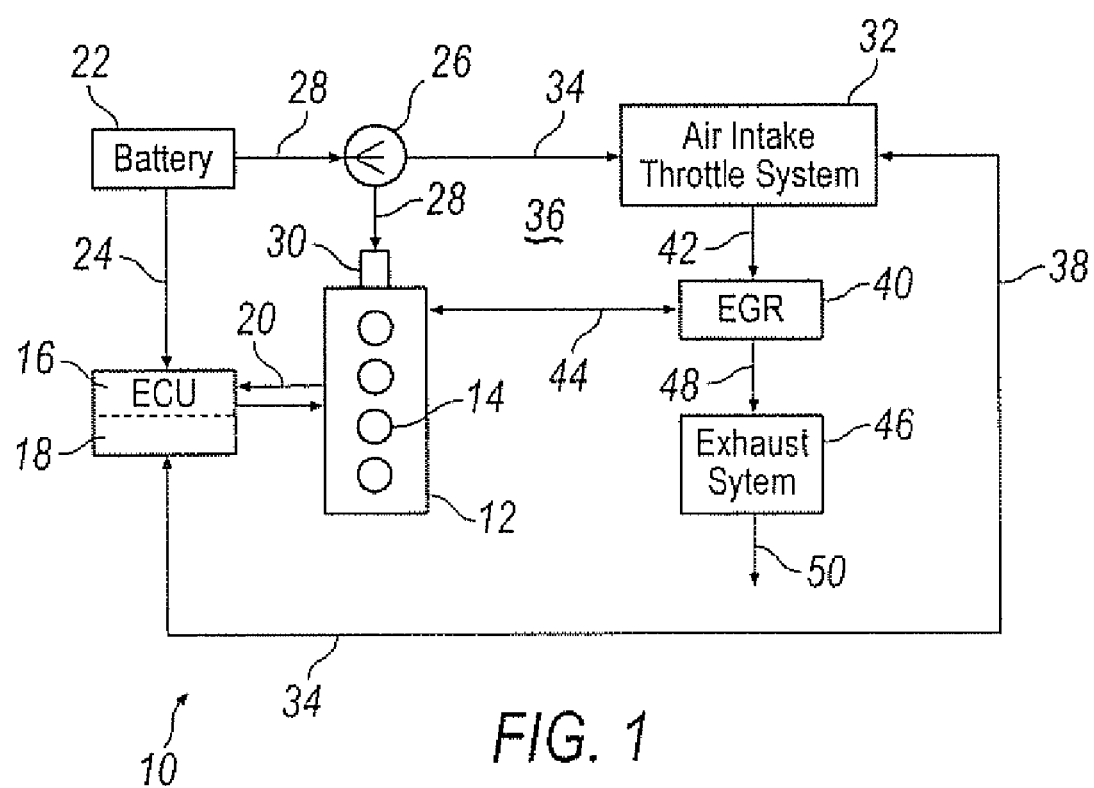
FIG. 1 is a representation of an internal combustion engine with an air intake throttle, battery. ECS with memory and an ignition switch.

Turning now to the drawings wherein like numbers refer to like structures, FIG. 1 is a representation of an internal combustion engine system 10 comprising an internal combustion engine 12, of any sort, but preferably an Otto Cycle or Rankin cycle compression ignition engine, having, pistons 14 reciprocally moveable in cylinders 15 in said engine in the conventional manner as is well know to those skilled in the art. An Electronic Control System, (ECS) 16 halving memory 18 which may be PROM, EPROM, EEPROM, FLASH or any other volatile or nonvolatile memory 18 wherein reside tables populated by various values for operating the engine and its componentry. The ECS may be comprised of one module or may be comprised of two modules or controllers, each in communication with the other, and in communication with the engine over an ECAN link 20. The controllers have a computer program therein to operate the engine. In the present instance, it is preferred to use a DDEC control software as is available from Detroit Diesel Corporation.

A battery 22 is in electrical connection 24 with the ECS to provide power directly to the ECS to ensure data stored in the ECS is not lost when the ignition is switched to a kev off position. Ignition switch 26 is in electrical connection with the battery via electrical connection 28. When the ignition is turned from a key off position to a key on position, current from the battery flows through the ignition switch to activate the part desired. For example, when the key in one on position, the starter 30 is activated through current supplied through electrical connection 98. When the key is in a second on position, current is supplied to the air intake manifold system 32 through electrical connection 34 and a circuit 36 is closed between the battery and the air intake throttle system. The air intake throttle system is in electronic communication with the ECS via electronic communication 38 to receive operating instructions from the ECS and to transmit operating data to the ECS indicative of the air throttle operating conditions. The Air intake throttle system is in fluid communication with the EGR 40 via conduit 42 for supply of air to the EGR, and the EGR is in fluid communication with the engine through conduit 44, as well as with the exhaust system 46 through conduit 48. The exhaust system vents exhaust gases from the engine system via outlet conduit 50.

Figure 2:
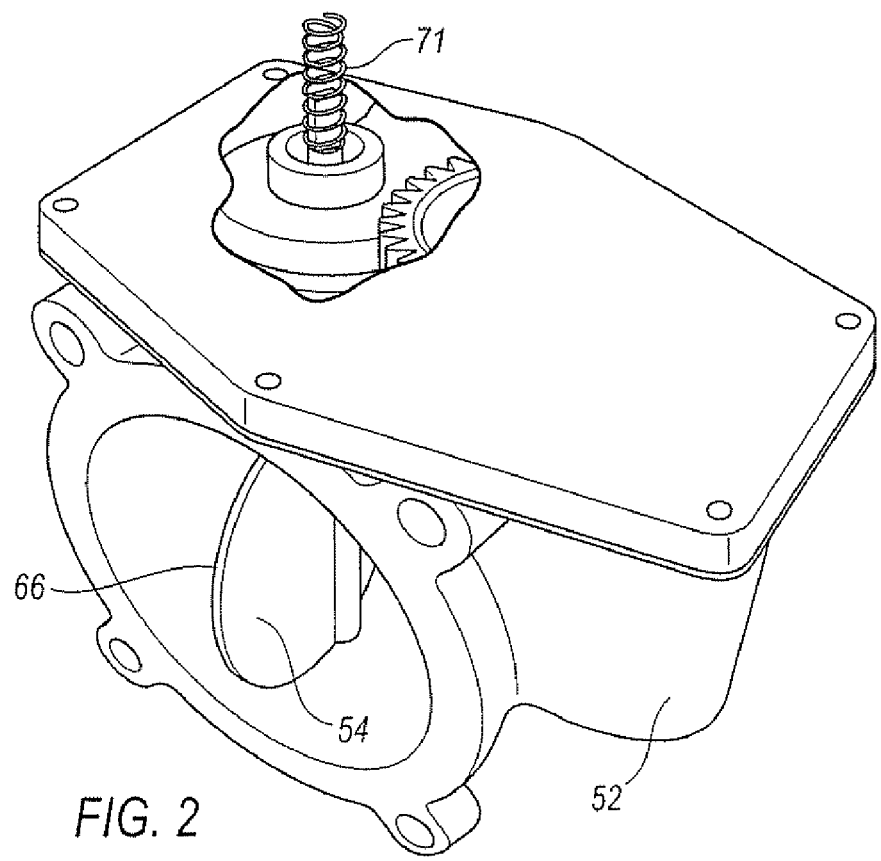
FIG. 2 is a perspective detailed view of an air intake throttle plate and actuator assembly.
Figure 3:
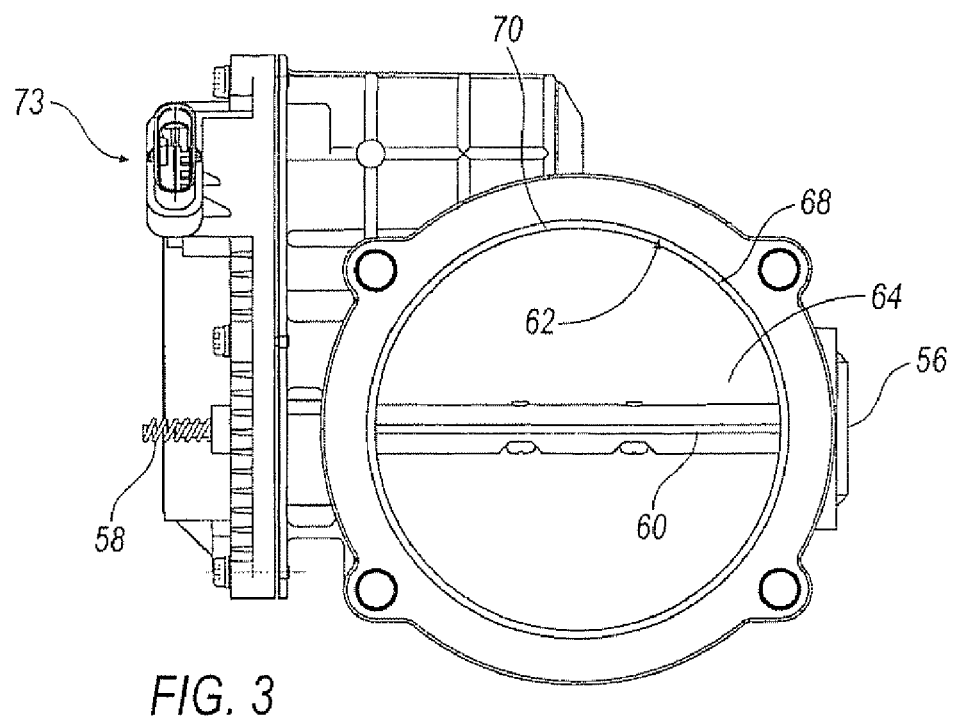
FIG. 3 is a top plan view of the air intake throttle mechanism and actiator assembly.

FIG. 2 is a perspective detailed view of an air intake throttle system showing the throttle plate with an actuator and FIG. 3 is a top plan view of the air intake throttle mechanism and actuator assembly. Specifically, the air intake throttle has a body 52 wherein a throttle plate 54 is pivotally mounted at pivots 56 and 58, respectively, to permit the throttle plate to pivot about axis 60. The throttle plate is manufactured to be of such dimension as to cover throttle throat 62 when in a fully closed position 64, to obstruct the flow of air into the engine and EGR, and permit the flow of air when the throttle plate is in a fully open position 66 as indicated in FIG. 2. The throttle plate throat 62 may have a flange 68 extending circumferentially around the throttle at a position in the throttle to facilitate a mating engagement with the throttle plate edges 70 to provide for a fully closed position, as is customary in the construction of air intake throttle bodies. A spring activated actuating device 71 actuates the throttle plate upon command from the ECS by application of current to the actuating device 73 causing the actuating device to pivotally move in the throttle body from an open position to a closed position, and by the cessation of current, the throttle moves from a closed position to an open position. By the application of current of varying amounts to the actuating device, the throttle is moved within the throttle body to any desired position.

Figure 4:
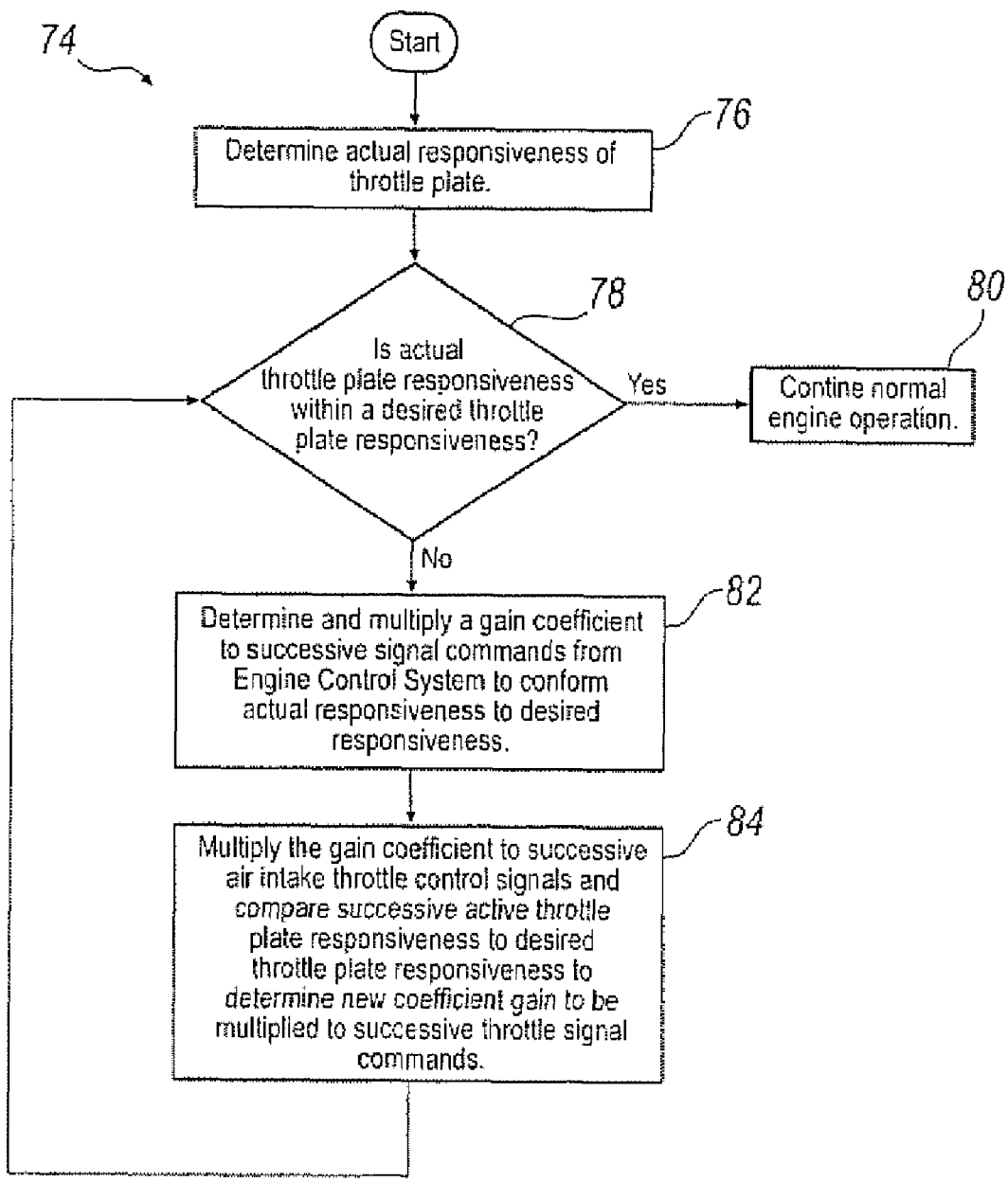
FIG. 4 is a schematic representation of a software flow chart showing one method for diagnosing intake throttle actuators for internal combustion engines.

FIG. 4 is schematic representation of a software flowchart of one method 74 according to one embodiment of the present invention. Specifically, step 76 is determining the actual responsiveness of the throttle plate. By way of background, it is known that air intake throttle plates can exhibit differences in throttle plate responsiveness that may vary as much as 35% between throttle plates, or within the same air intake manifold over time. This is primarily because of the spring used to actuate the throttle plate. Springs lose their resiliency during use and that loss must be compensated for over time. In addition, the throttle plate may wear due to use or age. In any event, the responsiveness of the throttle plate to a command signal may vary because of the air intake throttle plate or even just the spring/motor actuator. Step 78 is to determine whether the actual throttle plate responsiveness is within a desired throttle plate responsiveness period of time. If yes, then step 80 is to continue normal engine operation. If the throttle plate does not respond within a predetermined threshold of time in response to a given signal voltage from an ECS, step 82 is determine a gain coefficient to be added to the signal from the ECS that will permit operation of the throttle plate within the predetermined period of time, and add it, as at step 82 to the signal from the ECS to actuate the throttle plate to a desired position. The gain coefficient is an additional voltage added to successive signals from the ECS to the throttle plate actuator until such time as the throttle plate does not respond within the desired time. A new coefficient is then determined using the maximum and minimum response times at the given voltage of the command signal plus the coefficient gain over a predetermined number of times to determine a mean response time that is used to determine the coefficient gain to be applied to successive command signals from the ECS to the throttle plate actuator. The method then loops back to step 78 as the process continuously and periodically determines throttle plate responsiveness for determination whether to add a gain coefficient to the command signal from the ECS to actuate the air intake manifold throttle plate. The gain coefficient may be determined by running a series of tests, for example 25 tests, on the throttle plate to determine the maximum and minimum times and currents necessary to move the throttle plate to a desired position. A mean signal may then be determined by resort to the maximum and minimum times and signal strengths as that mean may be used as the gain coefficient. The gain coefficient may be determined for a number of engine operating conditions and stored in memory for use during engine operation.

The words used in the specification are understood to be words of description, not words of limitation. Those skilled in the art recognize that many variations and modifications are possible without departing for the scope and spirit of the invention as et forth in the appended claims.

What is claimed as new and desired to be protected by Letters Patent of the United States is:

1. A method to operate a spring actuated electronic air throttle control in an electronic controlled internal combustion engine with an engine control system having memory comprising
    determining a desired responsiveness of a throttle plate in an electronic control air throttle assembly;
    determining actual responsiveness of a throttle plate in an electronic control air throttle assembly;
    determining a coefficient gain for the throttle plate based upon responsiveness of the spring and storing said gain in memory;
    multiplying the coefficient gain to a throttle plate actuation command to operate said throttle plate to compensate for loss of spring or motor action during said throttle plate life and conform the actual throttle plate responsiveness to a determine throttle plate responsiveness.

2. The method of claim 1, wherein said coefficient gain is a value multiplied to an actuation command current to effect movement of the throttle plate to a desired position.

3. The method of claim 1 wherein said coefficient gain is determined by applying a fixed current to said throttle plate actuator to open and close a throttle plate a predetermined number of times; determining a maximum amount of time, a minimum amount of time, said coefficient gain being a mean amount of time for said throttle plate to open or close in response to said fixed current signal.

4. The method of claim 1, wherein said coefficient gain is continuously re-determined and multiplied to successive throttle plate actuation commands.

5. A method to operate an electronic controlled internal combustion engine with a spring actuated electronic controlled air intake manifold equipped with a throttle plate; said electronic controlled internal combustion engine equipped with an engine control system (ECS) with memory and in electronic communication with said air intake manifold; said method comprising:
    determining actual responsiveness of said spring actuate throttle plate in said air intake manifold in response to a signal command from said Engine Control System;

comparing said actual responsiveness of said throttle plate to a desired throttle plate responsiveness in memory;

multiplying a coefficient gain to successive signal commands from said Engine Control System to conform successive actual responsiveness times to said desired responsiveness time to compensate for loss of responsiveness in successive throttle plate actuations due to spring and/or motor variability in said air intake manifold and storing said coefficient gain in memory;

multiplying a coefficient gain to successive air intake throttle command signals from said Engine Control System and comparing the successive actual responsiveness of the throttle plate with desired responsiveness of the throttle plate to determine a new coefficient gain to be applied to ensure said throttle plate actuation is comparable to a desired throttle plate responsiveness.

6. The method of claim 5, wherein said coefficient gain is a value multiplied to an actuation command current to effect movement of the throttle plate to a desired position.

7. The method of claim 5, wherein said coefficient gain is determined by applying a fixed current to said throttle plate actuator to open and close a throttle plate a predetermined number of times; determining a maximum amount of time, a minimum amount of time, said coefficient gain being a mean amount of time for said throttle plate to open or close in response to said fixed current signal.

8. The method of claim 5, wherein said coefficient gain is continuously re-determined and multiplied to successive throttle plate actuation commands.

* * * * *